United States Statutory Invention Registration [19]

[11] Reg. Number: H207

Silvia et al. [43] Published: Feb. 3, 1987

[54] OVER-UNDER DESTRUCTIVE CROSSOVER CIRCUIT

[75] Inventors: Denis A. Silvia, Aberdeen; Herman J. Blische, Forest Hill, both of Md.

[73] Assignee: The United States of America as represented by the Secretary of the Army, Washington, D.C.

[21] Appl. No.: 898,543

[22] Filed: Aug. 15, 1986

Related U.S. Application Data

[63] Continuation-in-part of Ser. No. 380,204, May 20, 1982.

[51] Int. Cl.[4] ..... F42B 3/10; F42B 15/00

[52] U.S. Cl. ..... 102/275.9; 175/305

*Primary Examiner*—David H. Brown

*Attorney, Agent, or Firm*—Anthony T. Lane; Harold H. Card, Jr.; Michael C. Sachs

[57] ABSTRACT

The invention relates to destructive crossovers for explosive logic circuits, wherein two crossing paths of explosive material are embedded in a substrate in two separate planes. The first path which detonates across the intersection destroys the intersection so that the second path may detonate only to that point. The invention provides for minimal detonation pressure at the intersection, so as to avert the prior art problem of detonations turning the corner. This is accomplished by placing the paths on different planes.

19 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OVER-UNDER DESTRUCTIVE CROSSOVER CIRCUIT

The invention described herein may be manufactured, used and licensed by or for the Government for Governmental purposes without the payment to us of any royalties thereon.

Governmental Interest

This is a continuation-in-part of application Ser. No. 380,204, filed May 20, 1982.

Field of the Invention

This invention relates to ignition systems for explosive charges involving a logic circuit.

Background of the Invention

In missiles, projectiles or other weapon systems, explosive logic circuits have been considered for explosive initiation systems. They are also being considered for use in safe-and-arm and other mechanisms. Explosive logic consists of a circuit of trails embedded in a substrate and filled with explosive material. A device which may be included in a logic circuit is a destructive crossover, so that a detonation propagating along one trail destroys another crossing trail at the point of intersection.

In the prior art the trails in a crossover were of the same width and thickness and on one plane. An apparent problem is that one would expect the detonation to turn the corner at the intersection so as to result in the total detonation of both trails. The mechanism that kept the detonation from turning the corner from one trail into another is called "the corner effect." The functioning of the planer crossover is dependent upon the explosive thickness and trail widths at the intersection. In order for the corner effect to be reliable the trail thickness must be very close to the failure thickness of the explosive. Furthermore, variability in explosive behavior has caused variability in the corner effect. As a result, the planar crossover model has a reliability problem. Decreasing trail thickness to improve the corner effect only creates the problem of unreliable detonations along the individual trails. The corner effect has been described by H. John Blische and Denis A. Silvia in another patent identified above and to the extent necessary for understanding this invention it is incorporated herein by reference.

Summary of the Invention

This invention provides a mechanism by which a detonation is prevented from propagating in an explosive logic trail, via the destruction of that trail by another cross trail. The first trail continues through the intersection, but since the second trail is destroyed a later detonation in that trail will cease at the intersection.

The purpose of the present invention is to improve the reliability of explosive logic crossovers. This improvement is furthermore accomplished without reducing the thickness of the trails so as to jeopordize their detonation reliability. This is accomplished by constructing the intersection so that the area of explosive material in the first path which contacts the second path is no more than that which is required to reliably result in the destruction of only the cross-sectional region of the second path which is in the immediate vicinity of the intersection. Such a design results, among other benefits, in the minimization of the detonation pressure on the second path. This minimization of detonation pressure may be further enhanced by placing an outlet hole through the substrate material, which hole leads to the side of the second path which is opposite the side at which this path interfaces with the first path. Such a hole provides for pressure relief as well as the release of explosive products.

In the preferred embodiment, the intersection is constructed so that the central axes of the two paths run in separate planes. More specifically, the intersection may be constructed so that the paths intersect only at a single area of interface between their outer surfaces. The paths are generally of four-sided cross-section, and more generally rectangular, with a side of least width on the first path interfacing a side of greatest width on the second path. The two paths may have the same or different cross-sectional dimensions.

In summary, the present invention provides for a destructive crossover comprising two intersecting paths of explosive material embedded in a substrate material, wherein the cross-sectional area of each path is sufficiently large to achieve reliable detonation along that entire path and wherein the intersection is constructed so that detonation of the first path reliably results in the destruction of only the cross-sectional region of the second path which is in the immediate vicinity of the intersection.

Detailed Description of the Preferred Embodiment

Figure 1:
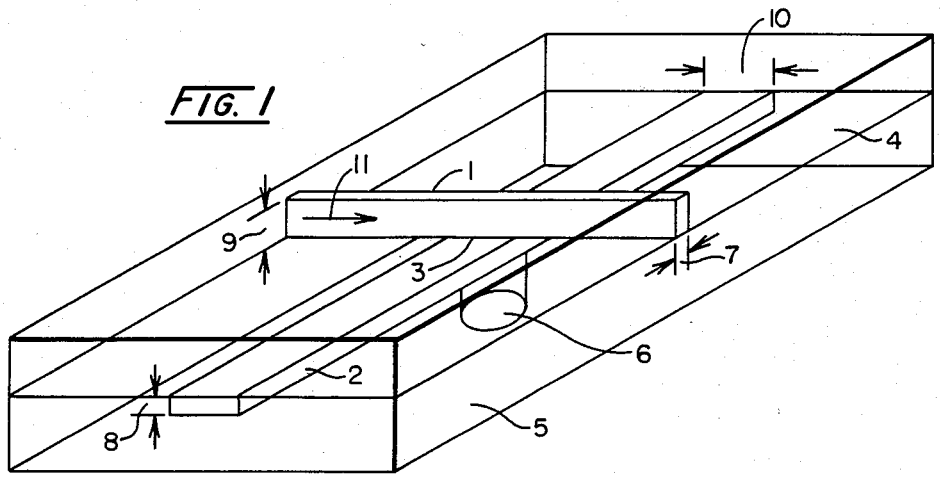
FIG. 1 is a perspective view of a schematic showing the planar destructive crossover of the present invention.

FIG. 1 illustrates the biplanar destructive crossover of the present invention. Path 1 intersects path 2 so that the paths meet only at a single interface 3 between the two planes. Path 1 is embedded in substrate 4 and path 2 is embedded in substrate 5. An outlet hole 6 is cut in substrate 5 underneath the area of intersection of the paths. The thickness 7 of path 1 and the thickness 8 of path 2 are shown, as are the width 9 of path 1 and the width 10 of path 2.

In the preferred embodiment, path 2 lies flat like a ribbon in substrate 5 as shown, while path 1 crosses path 2 like a knife blade. That is, a side of least width on path 1 interfaces with the side of greatest width on path 2. In the preferred embodiment, the diameter of the outlet hole 6 is equal to the width of the side of path 2 to which it leads.

A detonation in path 1 along the direction shown by the arrow 11 destroys the cross-sectional region of path 2 which lies underneath path 1 at the intersection 3. That is, the region of path 2 which is in the immediate vicinity of the intersection is destroyed, and only this region is destroyed. Explosive products and pressure are released through the outlet hole 6.

As a result, when a subsequent detonation is initiated along path 2, the detonation proceeds only to the point of intersection or interface 3, and stops.

The thickness 7 of path 1 and the thickness 8 of path 2, as well as the width 9 of path 1 and the width 10 of path 2, are sufficiently large so that detonations may propagate reliably along each trail.

Figure 2:
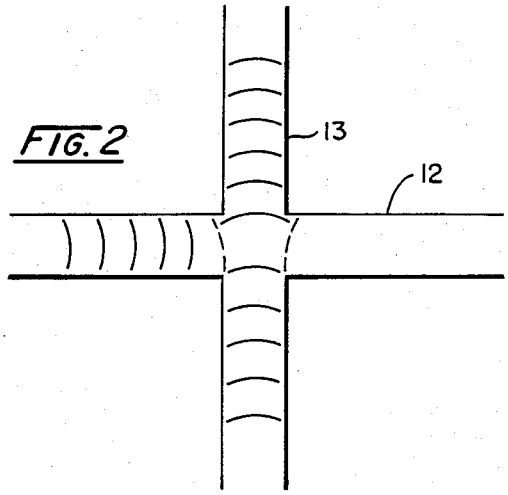
FIG. 2 is a plan view of the destructive crossover of the prior art.

FIG. 2 illustrates the prior art where paths 12 and 13 are in the same plane is a single substrate. The widths and heights of the paths are so dimensioned as to prevent detonation along path 13 from turning the corner into path 12 where they intersect.

Example

A specific embodiment of this invention is an over-/under destructive crossover designed for use with Dupont EL 506—C sheet explosive, "DETASHEET." Referring again to FIG. 1, the thickness 7 of path 1 is 0.040 inch, and the thickness 8 of path 2 is 0.035 inch. Both paths are embedded in a substrate 4 and 5 of polystyrene plastic. In this plastic, the failure thickness of DETASHEET is somewhere between 0.020 and 0.025 inch. Thus the thickness of paths 1 and 2 is well above the failure thickness. The width 9 of path 1 is 0.100 inch and the width 10 of path 2 is 0.075 inch. Finally, the diameter of the outlet hole 6 is 0.100 inch.

Figure 3:
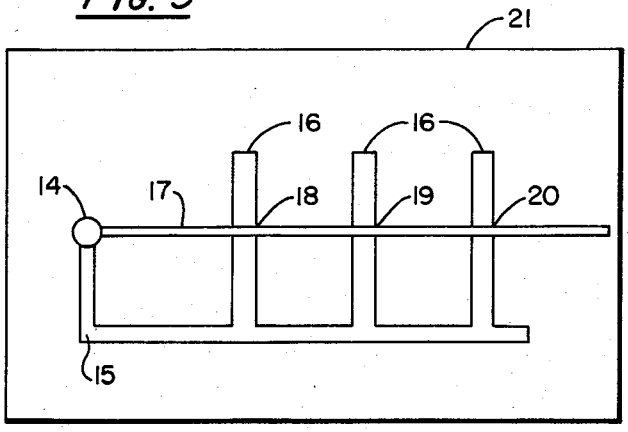
FIG. 3 is a plan view illustrating the test embodiment of the invention.

FIG. 3 illustrates a test plate which was fabricated according to the above detasheet embodiment. The trails are detonated by an electric detonator 14. Trail 15 divides into ribbon trails 16. Trail 17 crosses the ribbon trails at intersections 18, 19 and 20. The trails are embedded in substrate on an aluminum witness plate 21. Obviously, the shorter path 17-crosses intersections 18, 19 and 20 before the detonation path 15 and thus, there is no crossing of the intersections by the path 15, it was found in testing. Also, in testing it was found that in the configuration used, a delay of 4 micro-seconds is needed between the time the cutting (donor) trail detonates and when this cut (acceptor) trail will no longer permit propagation.

Seven such plates were tested for a total of twenty one crossover tests. Trail 17 and delay trail 15 were detonated by the electric detonator 14. Detonation in trail 17 arrived at the intersections 18, 19 and 20 before a delayed detonation in trail 15 and the ribbon trails 16. Recovered witness plates were inspected to see if any of the delayed detonations in the ribbon trails continued through the intersections. None did. Thus, twenty one out of twenty one crossovers functioned reliably.

For use with other explosives, the dimensions of the invention need only to be modified, or scaled according to the characteristics of the specific explosive used.

It will be appreciated that numerous changes and modifications may be made in the above described embodiments of the invention without departing from the scope thereof. Accordingly, the foregoing description is to be construed in an illustrative and not in a limitative sense, the scope of the invention being defined solely by the appended claims.

We claim:

1. A destructive crossover comprising two intersecting paths of explosive material embedded in a substrate material, said paths being a first path and a second path, wherein the cross-sectional area of each path is sufficiently large to achieve reliable detonation along that entire path and wherein the intersection is configured so that detonation of the first path reliably results in the destruction of only the cross-sectional region of the second path which is in the immediate vicinity of the intersection.

2. A destructive crossover as in claim 1, wherein the substrate material is polystyrene plastic and wherein the explosive material in the two paths is detasheet.

3. A destructive crossover as in claim 1, further comprising an outlet hole through the substrate material, which outlet hole leads to a side of the second path which is opposite the side at which said second path interfaces with the first path.

4. A destructive crossover as in claim 3, wherein the diameter of said outlet hole is equal to the width of the side of the second path to which said hole leads.

5. A destructive crossover as in claim 3, wherein the substrate material is polystyrene plastic and wherein the explosive material in the two paths is detasheet.

6. A destructive crossover as in claim 1, wherein the intersection is configured so that the area of explosive material in the first path which contacts the second path is no more than that which is required to reliably result in the destruction of only said cross-sectional region of the second path.

7. A destructive crossover as in claim 6, wherein the substrate material is polystyrene plastic and wherein the explosive material in the two paths is detasheet.

8. A destructive crossover as in claim 6, further comprising an outlet hole through the substrate material, which outlet hole leads to a side of the second path which is opposite the side at which said second path interfaces with the first path.

9. A destructive crossover as in claim 8, wherein the diameter of said outlet hole is equal to the width of the side of the second path to which said hole leads.

10. A destructive crossover as in claim 8, wherein the substrate material is polystyrene plastic and wherein the explosive material in the two paths is detasheet.

11. A destructive crossover as in claim 1, wherein the paths each have an axis and said axes of the two paths run in separate planes.

12. A destructive crossover as in claim 11, wherein the two paths intersect only at a single area of interface between their outer surfaces.

13. A destructive crossover as in claim 12, wherein the two paths are of four-sided cross-section, and wherein a side of least width on the first path interfaces with a side of greatest width on the second path.

14. A destructive crossover as in claim 13, wherein the substrate material is polystyrene plastic and wherein the explosive material in the two paths is detasheet.

15. A destructive crossover as in claim 13, wherein the two paths have the same cross-sectional dimensions.

16. A destructive crossover as in claim 15, wherein the two paths are of rectangular cross-section.

17. A destructive crossover as in claim 13, further comprising an outlet hole through the substrate material, which outlet hole leads to a side of the second path which is opposite the side at which said second path interfaces with the first path.

18. A destructive crossover as in claim 17, wherein the diameter of said outlet hole is equal to the width of the side of the second path to which said hole leads.

19. A destructive crossover as in claim 17, wherein the substrate material is polystyrene plastic and wherein the explosive material in the two paths is detasheet.

* * * * *